(12) United States Patent
Ingle et al.

(10) Patent No.: US 8,868,888 B2
(45) Date of Patent: Oct. 21, 2014

(54) SYSTEM AND METHOD OF EXECUTING INSTRUCTIONS IN A MULTI-STAGE DATA PROCESSING PIPELINE

(75) Inventors: Ajay Anant Ingle, Austin, TX (US); Lucian Codrescu, Austin, TX (US); Suresh K. Venkumahanti, Austin, TX (US)

(73) Assignee: QUALCOMM Incorporated, San Diego, CA (US)

( * ) Notice: Subject to any disclaimer, the term of this patent is extended or adjusted under 35 U.S.C. 154(b) by 957 days.

(21) Appl. No.: 11/850,940

(22) Filed: Sep. 6, 2007

(65) Prior Publication Data
US 2009/0070602 A1 Mar. 12, 2009

(51) Int. Cl.
*G06F 15/00* (2006.01)
*G06F 9/44* (2006.01)
*G06F 9/00* (2006.01)
*G06F 7/38* (2006.01)
*G06F 9/38* (2006.01)

(52) U.S. Cl.
CPC ............ *G06F 9/3851* (2013.01); *G06F 9/3867* (2013.01)
USPC ....................................................... 712/229

(58) Field of Classification Search
USPC ....................................................... 712/229
See application file for complete search history.

(56) References Cited

U.S. PATENT DOCUMENTS

| | | | |
|---|---|---|---|
| 5,471,626 A | 11/1995 | Carnevale et al. | |
| 6,247,134 B1 * | 6/2001 | Sproch et al. ................ | 713/320 |
| 7,117,344 B1 | 10/2006 | Ohwada | |
| 2002/0138777 A1 * | 9/2002 | Feierbach ..................... | 713/324 |
| 2003/0037226 A1 | 2/2003 | Tsuruta et al. | |
| 2004/0068640 A1 * | 4/2004 | Jacobson et al. .............. | 712/220 |

FOREIGN PATENT DOCUMENTS

| | | |
|---|---|---|
| JP | 57168350 A | 10/1982 |
| JP | 58090247 A | 5/1983 |
| JP | 63141131 A | 6/1988 |
| JP | 5334081 A | 12/1993 |
| JP | 6095872 A | 4/1994 |
| JP | 6314196 A | 11/1994 |
| JP | 8147164 A | 6/1996 |
| JP | 9269895 A | 10/1997 |
| JP | 2001109626 A | 4/2001 |
| JP | 2003316566 A | 11/2003 |
| JP | 2007528549 A | 10/2007 |
| WO | 0133351 | 5/2001 |
| WO | 0150249 | 7/2001 |
| WO | 2005091130 | 9/2005 |

OTHER PUBLICATIONS

European Opinion—EP08006415, Search Authority—The Hague—Aug. 18, 2008.
European Search Report—EP08006415, Search Authority—The Hague—Aug. 18, 2008.

(Continued)

*Primary Examiner* — Corey S Faherty
(74) *Attorney, Agent, or Firm* — Peter Michael Kamarchik; Nicholas J. Pauley; Joseph Agusta

(57) ABSTRACT

A device is disclosed that includes an instruction execution pipeline having multiple stages for executing an instruction. The device also includes a control logic circuit coupled to the instruction execution pipeline. The control logic circuit is adapted to skip at least one stage of the instruction execution pipeline during execution of the instruction. The control logic circuit is also adapted to execute at least one non-skipped stage during execution of the decoded instruction.

38 Claims, 4 Drawing Sheets

(56) References Cited

OTHER PUBLICATIONS

International Search Report—PCT/US08/075270, International Search Authority—European Patent Office—Nov. 4, 2008.

Written Opinion—PCT/US08/075270, International Search Authority—European Patent Office—Nov. 4, 2008.

Chinese Office Action dated May 10, 2012 for Chinese Patent Application Serial No. 200880111057.1, 7 pages.

* cited by examiner

SYSTEM AND METHOD OF EXECUTING INSTRUCTIONS IN A MULTI-STAGE DATA PROCESSING PIPELINE

I. FIELD

The present disclosure is generally related to a system and method of executing instructions in a multi-stage data processing pipeline.

II. DESCRIPTION OF RELATED ART

Advances in technology have resulted in smaller and more powerful personal computing devices. For example, there currently exist a variety of portable personal computing devices, including wireless computing devices, such as portable wireless telephones, personal digital assistants (PDAs), and paging devices that are small, lightweight, and easily carried by users. More specifically, portable wireless telephones, such as cellular telephones and IP telephones, can communicate voice and data packets over wireless networks. Further, many such wireless telephones include other types of devices that are incorporated therein. For example, a wireless telephone can also include a digital still camera, a digital video camera, a digital recorder, and an audio file player. Also, such wireless telephones can include a web interface that can be used to access the Internet. As such, these wireless telephones include significant computing capabilities.

Typically, portable personal computing devices are powered by a battery. As these devices become more powerful, the devices may consume more power and reduce the amount of time the battery can power the device.

Accordingly, it would be advantageous to provide an improved system and method of executing instructions in a processor.

III. SUMMARY

In a particular embodiment, a device is disclosed that includes an instruction execution pipeline having multiple stages for executing an instruction. The device also includes a control logic circuit coupled to the instruction execution pipeline. The control logic circuit is adapted to skip at least one stage of the decoded instruction execution pipeline during execution of the decoded instruction. The control logic circuit is also adapted to execute at least one non-skipped stage during execution of the decoded instruction.

In another particular embodiment, a method is disclosed that includes decoding an instruction to determine when the instruction can be executed using less than a number of available stages in a multi-stage data processing pipeline. The method also includes skipping at least one stage of the multi-stage data processing pipeline during execution of the decoded instruction and executing at least one non-skipped stage during execution of the decoded instruction.

In yet another particular embodiment, a device is disclosed that includes an instruction execution pipeline and a register file adapted to receive data from the instruction execution pipeline. The device also includes means for skipping at least one stage of multiple available stages of the instruction execution pipeline during execution of an instruction.

In still another particular embodiment, a wireless device is disclosed that includes a receiver and a processor responsive to the receiver. The processor includes a first memory and an interleaved multi-stage data processing pipeline responsive to the first memory. The processor is adapted to decode an instruction to determine when the instruction can be executed using less than a number of available stages in the interleaved multi-stage data processing pipeline. The processor is also adapted to skip at least one stage of the interleaved multi-stage data processing pipeline during execution of the instruction. The processor is further adapted to execute at least one non-skipped stage during execution of the decoded instruction.

One particular advantage of the described devices and methods is that power can be saved during a skipped cycle. Another particular advantage of the described devices and methods is that battery life of a portable device may be extended.

Other aspects, advantages, and features of the present disclosure will become apparent after review of the entire application, including the following sections: Brief Description of the Drawings, Detailed Description, and the Claims.

IV. BRIEF DESCRIPTION OF THE DRAWINGS

Figure 1:
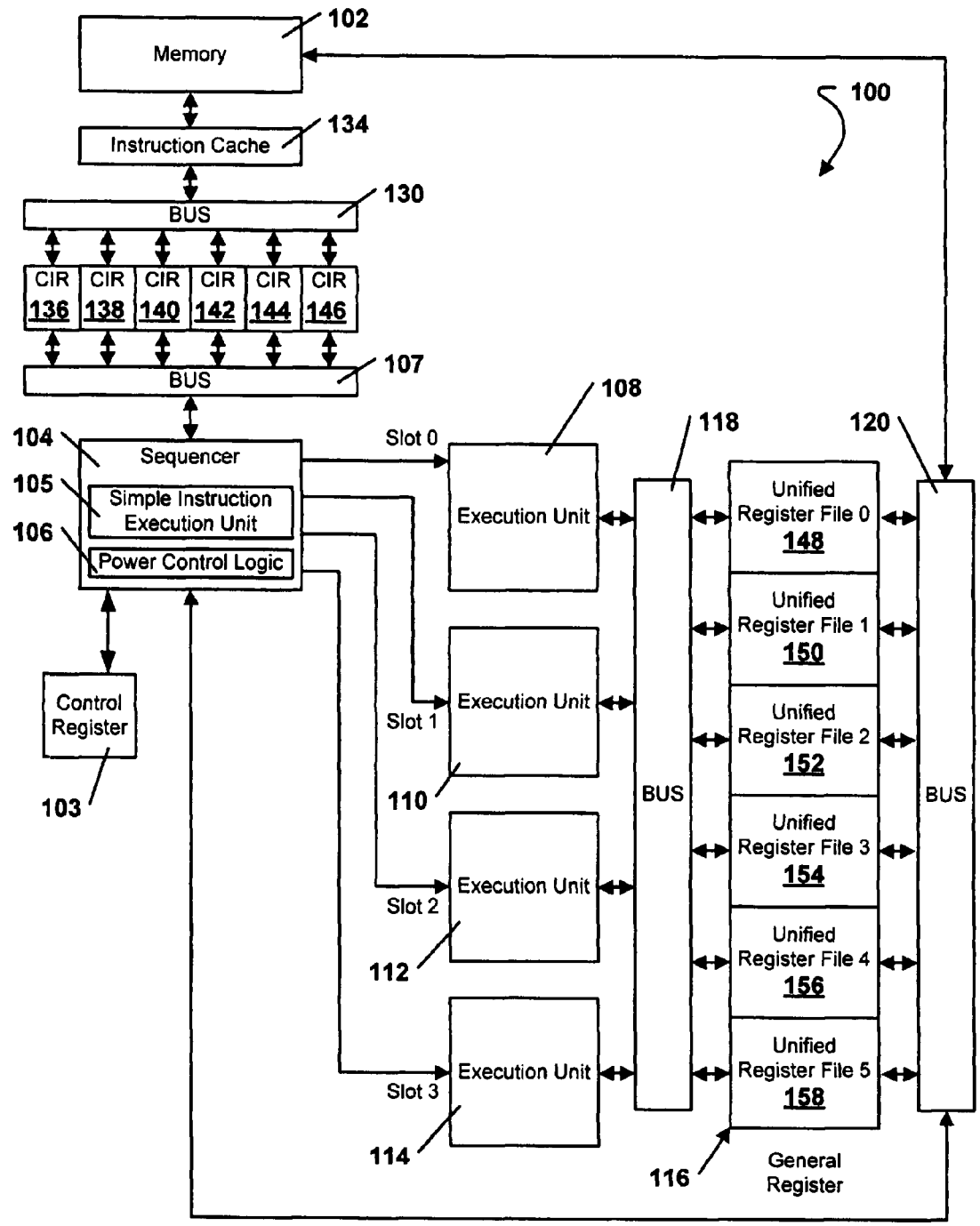
FIG. 1 is a block diagram of an embodiment of a system for executing instructions in a multi-stage data processing pipeline.
Figure 2:
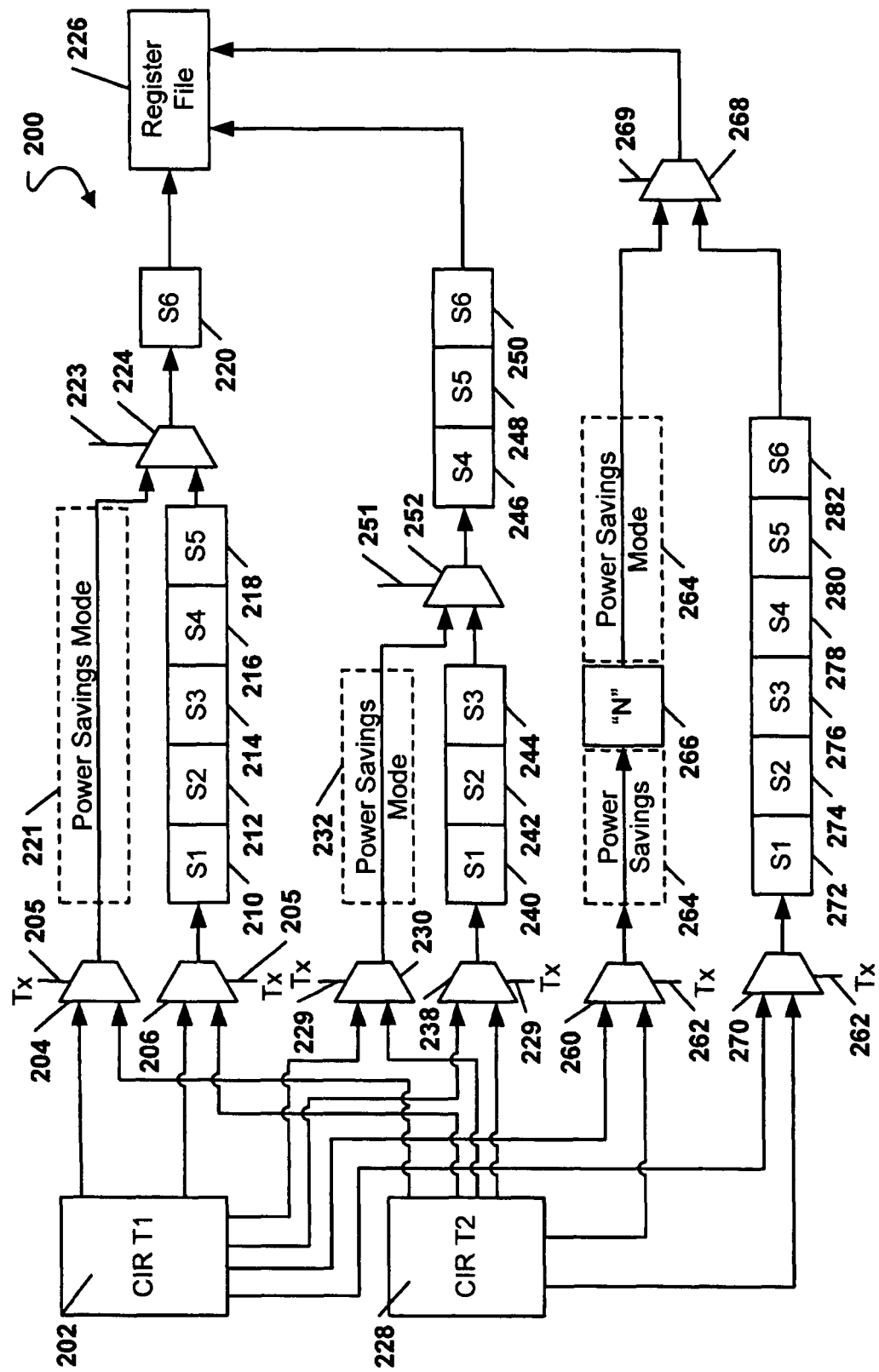
FIG. 2 is a block diagram of another embodiment of a system for executing instructions in a multi-stage data processing pipeline.
Figure 3:
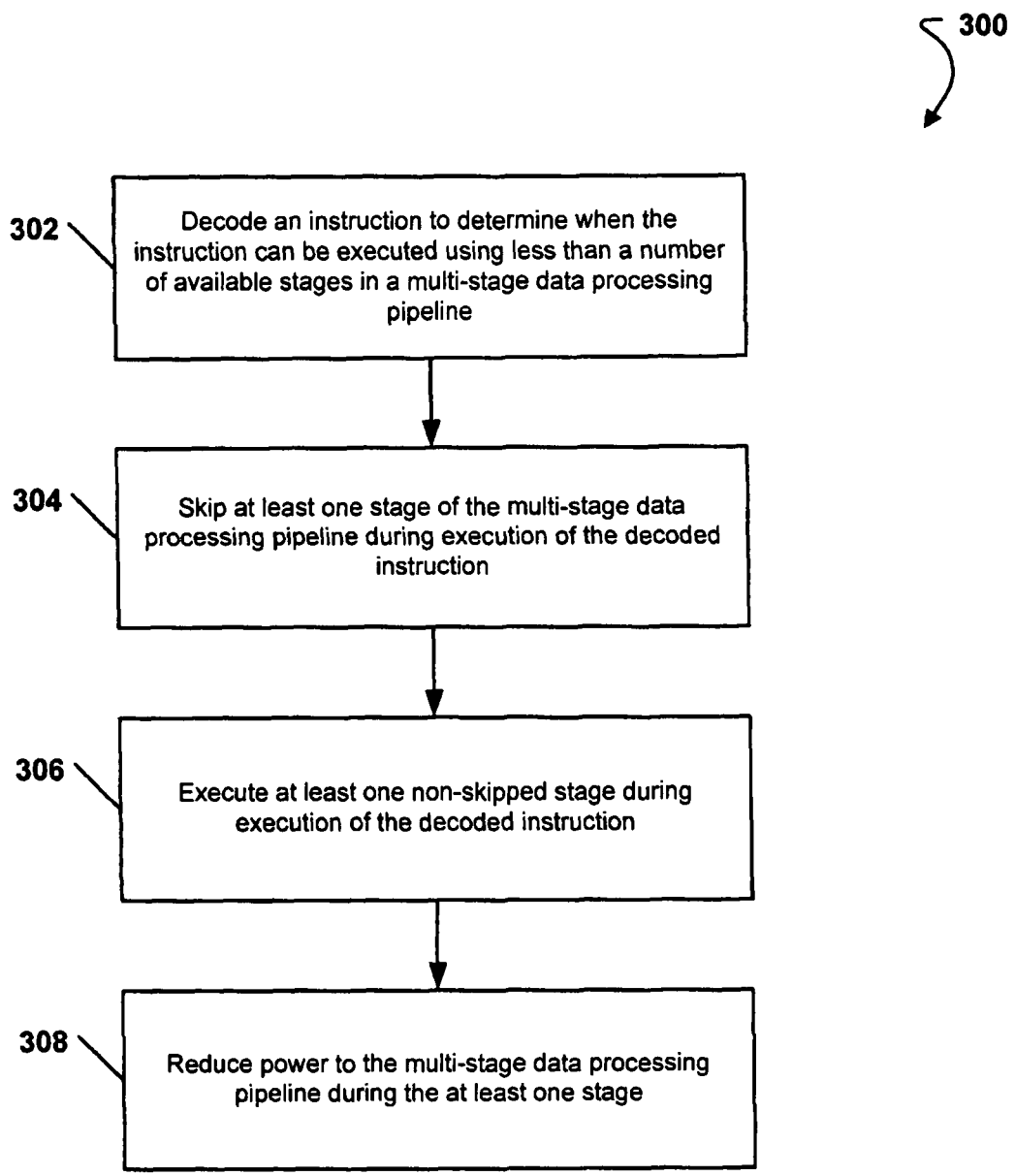
Figure 4:
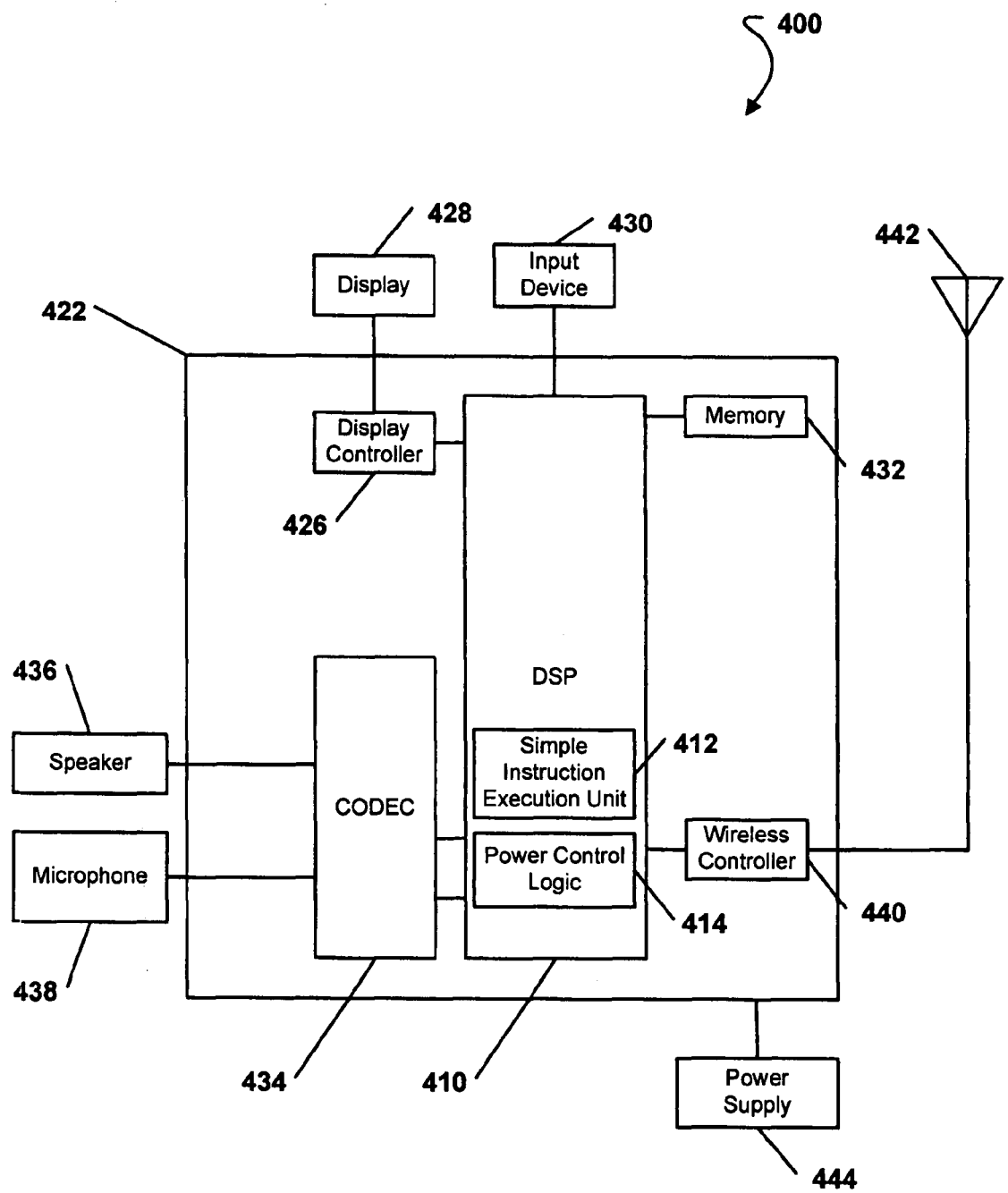

FIG. 3 is a flow chart of an embodiment of a method of executing instructions in a multi-stage data processing pipeline; and FIG. 4 is an exemplary embodiment of a portable communication device that may utilize a device for executing instructions in a multi-stage data processing pipeline and a method of executing instructions in a multi-stage data processing pipeline, such as that described with respect to FIGS. 1-3.

V. DETAILED DESCRIPTION

FIG. 1 illustrates a block diagram of an exemplary, non-limiting embodiment of a processor 100. As illustrated in FIG. 1, the processor 100 includes a memory 102 that is coupled to an instruction cache 134. The instruction cache 134 is coupled to current instruction registers (CIRs) 136, 138, 140, 142, 144, and 146 via a bus 130. Each of the CIRs 136-146 may be associated with a particular thread in a multi-threaded processor. In a particular embodiment, the processor 100 is an interleaved multi-threaded processor having six threads where each of the CIRs 136-146 comprise one thread of the interleaved multi-threaded processor.

The CIRs 136-146 are coupled to a sequencer 104 via a bus 107. In a particular embodiment, the bus 107 is a sixty-four (64) bit bus and the sequencer 104 is configured to retrieve instructions from the memory 102 having a length of thirty-two (32) bits. The bus 107 is coupled to a first instruction execution unit 108, a second instruction execution unit 110, a third instruction execution unit 112, and a fourth instruction execution unit 114. FIG. 1 indicates that each instruction execution unit 108, 110, 112, 114 can be coupled to a general register file 116 via a first bus 118. The general register file 116 can also be coupled to the sequencer 104 and the memory 102 via a second bus 120.

In a particular embodiment, the memory 102 is a content addressable memory (CAM) and the instruction cache 134 can include a plurality of instructions, instruction steering data for each instruction, and instruction pre-decode data for each instruction. During operation, the CIRs 136-146 pull instructions from the instruction cache 134 and the CIRs 136-146 can be accessed independently of each other by the sequencer 104.

In a particular embodiment, the sequencer 104 includes a simple instruction execution unit 105. The sequencer 104 also includes power control logic circuit 106. Further, the sequencer 104 may be coupled to a control register 103 that allows for the processor 100 to determine when the simple instruction execution unit 105 and the power control logic circuit 106 can be selectively activated.

As depicted in FIG. 1, the general register 116 includes a first unified register file 148, a second unified register file 150, a third unified register file 152, a fourth unified register file 154, a fifth unified register file 156, and a sixth unified register file 158. Each unified register file 148, 150, 152, 154, 156, 158 corresponds to one of the CIRs 136-146. Further, in a particular embodiment, each unified register file 148, 150, 152, 154, 156, 158 has the same construction and includes an equal number of data operands and address operands.

During operation of the processor 100, instructions are fetched from the instruction cache 134 by the CIRs 136-146 via the bus 130. The instructions are then processed by the sequencer, sent to designated instruction execution units 108, 110, 112, 114, and executed at the instruction execution units 108, 110, 112, 114. The results at each instruction execution unit 108, 110, 112, 114 can be written to the general register 116, i.e., to one of the unified register files 148, 150, 152, 154, 156, 158.

In a particular embodiment, the sequencer 104 may selectively enable the simple instruction execution unit 105 based on a value in the control register 103. When enabled, the simple instruction execution unit 105 may decode an instruction from a selected CIR to determine when the instruction can be executed using less than a number of available stages in a multi-stage data processing pipeline. The simple instruction execution unit 105 may then skip at least one stage of the multi-stage data processing pipeline during execution of the decoded instruction. To skip a stage of the pipeline, the processor 100 may hold the instruction in the respective CIR during the cycles of the skipped stage(s) until a stage that is to execute the instruction. The simple instruction execution unit 105 may also execute at least one non-skipped stage during execution of the decoded instruction.

In a particular embodiment, the power control logic circuit 106 may reduce power to the multi-stage data processing pipeline during a skipped stage. Reducing the power may include turning off dynamic power to the skipped stage, turning off static power to the skipped stage, or both. The power control logic circuit 106 may return the power to a nominal operating level prior to execution of a stage of the multi-stage data processing pipeline that will not be skipped.

FIG. 2 illustrates a block diagram of another embodiment of a system 200 for executing instructions in a multi-stage data processing pipeline. In a particular embodiment, the system 200 may be implemented in a multi-threaded processor, such as the processor 100 shown in FIG. 1. For example, a multi-stage data processing pipeline may include the sequencer 104 and one or more of the execution units 108, 110, 112, and 114. The multi-stage data processing pipeline may fetch an instruction from a CIR, such as CIR 136, process the instruction, and store a result in a register file, such as register file 148.

In a particular embodiment, the system 200 may be implemented in an interleaved multi-threaded processor where each thread can have a fixed time slot for every stage of the pipeline. When each thread uses its allocated time slot, there is no collision between threads. Other architectures not implementing interleaved processing may implement the system 200, but there may be collision between threads. The other architectures may have to implement a collision resolution technique.

In a multiple stage instruction execution pipeline, some instructions do not require all of the hardware that is available in the pipeline to execute an instruction. In a particular embodiment, an instruction execution pipeline may skip one or more stages in the pipeline and execute only those stages necessary to execute an instruction. To skip a stage of a pipeline, the instruction may be held in the respective CIR during the cycles for the skipped stage(s) until a stage that is to execute the instruction. The holding cycles can be determined by control logic, such as a controller or a discrete timing circuit. In another particular embodiment, an instruction execution pipeline may only execute a portion of the hardware of a single stage that is necessary to execute a complete instruction. The executed stages or portion of a stage may be any stage of a multi-stage instruction execution pipeline. The system 200 provides three examples of pipelines that may execute an instruction using less than all of the stages of a multi-stage instruction execution pipeline. Skipping stages of an instruction execution pipeline can work particularly well in an interleaved multi-threaded processor where each thread can have a fixed time slot for every stage of the pipeline The system 200 includes a first current instruction register (CIR) 202. The first CIR 202 may be associated with a first thread of the multi-threaded processor. The first CIR 202 may be coupled to a first multiplexer 204 and a second multiplexer 206 that comprise a first instruction execution pipeline that has multiple stages for executing an instruction. The first CIR 202 may also be coupled to a third multiplexer 230, a fourth multiplexer 238, a fifth multiplexer 260, and a sixth multiplexer 270. In a particular embodiment, each instruction execution pipeline may have six stages available for execution of the instruction. In an interleaved multi-threaded processor, each stage in the instruction execution pipeline can have a fixed time slot for executing in the pipeline. Both the first multiplexer 204 and the second multiplexer 206 can have a control line 205 for selecting which CIR the first instruction execution pipeline will receive an instruction from. The control lines 205 may be coupled to a control logic circuit, such as the sequencer 104 shown in FIG. 1, for selecting a single thread of the multi-threaded processor.

The first instruction execution pipeline includes a first stage 210, a second stage 212, a third stage 214, a fourth stage 216, a fifth stage 218, and a sixth stage 220. The first instruction execution pipeline has two operating modes that may be selected via a multiplexer 224. The first operating mode includes executing the instruction at the first stage 210, the second stage 212, the third stage 214, the fourth stage 216, the fifth stage 218, and the sixth stage 220. The second operating mode includes skipping the first stage 210, the second stage 212, the third stage 214, the fourth stage 216, and the fifth stage 218 during a power savings mode 221 and then executing the sixth stage 220. The power savings mode 221 may be for a length of one or more clock cycles used for execution of the stages. The length of the power savings mode may be variable based on an instruction to be executed. The multiplexer 224 may selectively provide the instruction from the first CIR 202 to the input of the sixth stage 220 during the second operating mode or may provide the output from the fifth stage 218 to the input of the sixth stage 220 during the first operating mode. The multiplexer 224 may have a control line 223 for selecting whether the first operating mode or the second operating mode is selected. The control line 223 may be coupled to a control logic circuit, such as the sequencer 104 shown in FIG. 1, to select the first operating mode or the second operating mode. An output of the sixth stage 220 may be coupled to a register file 226.

In a particular illustrative embodiment, the system 200 may also include a second CIR 228 that is associated with a second thread of the multi-threaded processor. The second CIR 228 may be coupled to the first multiplexer 204, the second multiplexer 206, the third multiplexer 230, the fourth multiplexer 238, and the fifth multiplexer 260. The third multiplexer 230 and the fourth multiplexer 238 comprise a second instruction execution pipeline that has multiple stages for executing an instruction. The third multiplexer 230 and the fourth multiplexer 238 each have a control line 229 for selecting which CIR the second instruction execution pipeline will receive an instruction from. The control lines 229 may be coupled to the control logic circuit for selecting a single thread of the multi-threaded processor.

The second instruction execution pipeline includes a first stage 240, a second stage 242, a third stage 244, a fourth stage 246, a fifth stage 248, and a sixth stage 250. The second instruction execution pipeline has two operating modes that may be selected via the multiplexer 252. The first operating mode includes executing the instruction at the first stage 240, the second stage 242, the third stage 244, the fourth stage 246, the fifth stage 248, and the sixth stage 250.

The second operating mode includes skipping the first stage 240, the second stage 242, and the third stage 244, during a power savings mode 232 and then executing the fourth stage 246, the fifth stage 248, and the sixth stage 250. The power savings mode 232 may be for a length of one or more clock cycles used for execution of the skipped stages. The length of the power savings mode may be variable based on an instruction to be executed. The multiplexer 252 may selectively provide the instruction from the second CIR 228 to the input of the fourth stage 246 during the second operating mode or may provide the output from the third stage 244 to the input of the fourth stage 246 during the first operating mode. The multiplexer 252 may have a control line 251 for selecting whether the first operating mode or the second operating mode is selected. The control line 251 may be coupled to a control logic circuit, such as the sequencer 104 shown in FIG. 1, to select the first operating mode or the second operating mode. An output of the sixth stage 250 may be coupled to a register file 226.

In another particular illustrative embodiment, the system 200 may have a third instruction execution pipeline that includes the fifth multiplexer 260 and the sixth multiplexer 270. The fifth multiplexer 260 and the sixth multiplexer 270 may have a control line 262 for selecting which CIR the third instruction execution pipeline will receive an instruction from. The control line 262 may be coupled to a control logic circuit for selecting a single thread of the multi-threaded processor.

The third instruction execution pipeline includes a first stage 272, a second stage 274, a third stage 276, a fourth stage 278, a fifth stage 280, and a sixth stage 282. The third instruction execution pipeline has two operating modes that may be selected via the multiplexer 268. The multiplexer 268 may have a control line 269 for selecting whether the first operating mode or the second operating mode is selected. The control line 269 may be coupled to a control logic circuit, such as the sequencer 104 shown in FIG. 1, to select the first operating mode or the second operating mode.

The first operating mode includes executing the instruction at the first stage 272, the second stage 274, the third stage 276, the fourth stage 278, the fifth stage 280, and the sixth stage 282. The second operating mode includes an instruction execution stage 266. The instruction execution stage 266 may be any stage or a portion of a stage of the third instruction execution pipeline. The stages of the pipeline other than the instruction execution stage 266 may be skipped and a power savings mode 264 may be implemented to conserve energy. For example, in a six stage pipeline, the instruction execution stage 266 may be the third stage or a portion of the third stage of the third instruction execution pipeline; thus, the first, second, fourth, fifth, and sixth stages may be skipped and a power savings mode may be implemented during the time those stages would have executed. The multiplexer 268 may selectively provide an output of the first operating mode or an output of the second operating mode to the register file 226.

In a particular embodiment, the system 200 shows an embodiment having two threads, however the system 200 may be expanded to support any number of threads. In a particular embodiment, the system 200 includes six threads.

During operation, a first instruction from the CIR 202 can be decoded to determine when the instruction can be executed using less than a number of stages available in the first instruction execution pipeline. An opcode of the instruction may be read to determine the number of stages needed to execute the instruction. In a particular embodiment, the instruction may be a write only instruction. In another particular embodiment, the instruction may be an instruction that does not include a register file read. In yet another particular embodiment, the instruction may be a combine instruction.

When the instruction can be executed using less than the number of stages available in the first instruction execution pipeline and only using the stages available in the second operating mode, the control line 223 can be activated to select the second operating mode for execution of the instruction. The first CIR 202 may then pass the instruction to the first multiplexer 204. When the control line 205 selects the thread corresponding to the first CIR 202, the first multiplexer 204 may provide the instruction from the first CIR 202 to the multiplexer 224.

During execution of the instruction during the second operating mode of the first pipeline, the system 200 may reduce power to the first instruction execution pipeline by entering the power savings mode 221 to reduce power consumed by the stages that are not needed to execute the instruction. The power savings mode 221 may include turning off dynamic power during the power down stage, turning off static power during the power down stage, or both. The power may be returned to an operating level prior to a stage that needs to be executed. After the power savings mode 221 has been exited, the sixth stage 220 may execute the instruction and provide the output to the multiplexer 224 to be provided to the register file 226. In an interleaved multi-threaded processor, the power savings mode 221 may be exited based on the time slots assigned to the skipped stages and the sixth stage 220. In a particular embodiment, the sixth stage 220 may include a register file write execution.

When the instruction cannot be executed using less than the number of stages in the first instruction execution pipeline, the control line 223 is activated to select the first operating mode to execute the instruction. The first CIR 202 may then pass the instruction to the second multiplexer 206. The second multiplexer 206 provides the instruction from the first CIR 202 to the instruction execution stage 210 to execute the instruction. The instruction can then be executed by the instruction execution stages 210, 212, 214, 216, 218, and 220 before sending the output to be stored in the register file 226.

Instructions from the second CIR 228 may be executed similarly as described above with respect to the first CIR 228. In addition, the operation of the third multiplexer 230, the fourth multiplexer 238, the second instruction execution pipeline, and the multiplexer 252 may operate similarly as described above. However, as shown in FIG. 2, the second operating mode of the second instruction execution pipeline has three stages (the fourth stage 246, the fifth stage 248, and the sixth stage 250) that can be executed.

The third instruction execution pipeline may also be operated similar to described above. When an instruction from a CIR can be executed using less than the number of stages available in the first operating mode of the third instruction execution pipeline and the instruction can be executed using only the stage, stages, or portion of a stage available for execution in the second operating mode, the second operating mode may be selected by the multiplexer 268. When the instruction from the CIR can not be executed using the second operating mode of the third instruction execution pipeline, the first operating mode may be selected by the multiplexer 268.

FIG. 3 illustrates a flow chart of an embodiment of a method 300 of executing instructions in a multi-stage data processing pipeline. The method 300 includes decoding an instruction to determine when the instruction can be executed using less than a number of available stages in a multi-stage data processing pipeline, at 302. In a particular embodiment, the decoding is performed prior to execution of the instruction. In another particular embodiment, the decoding includes determining an instruction by identifying an opcode of the instruction. In yet another particular embodiment, the instruction is received from a current instruction register (CIR).

The method 300 also includes skipping at least one stage of the multi-stage data processing pipeline during execution of the decoded instruction, at 304. The at least one skipped stage may be a first stage, a last stage, or a stage in between the first stage and the last stage of the multi-stage data processing pipeline.

The method further includes executing at least one non-skipped stage during execution of the decoded instruction, at 306. In a particular embodiment, the instruction may be a write only instruction. In another particular embodiment, the instruction may be an instruction that does not include a register file read. In yet another particular embodiment, the instruction may be a combine instruction.

In a particular embodiment, the method 300 includes reducing power to the multi-stage data processing pipeline during the at least one skipped stage, at 308. In another particular embodiment, reducing the power may include turning off dynamic power to the at least one skipped stage. In yet another particular embodiment, reducing the power may also include turning off static power to the at least one skipped stage. The method 300 may include increasing the power prior to a stage of the multi-stage data processing pipeline that will not be skipped.

In a particular embodiment, the multi-stage data processing pipeline may be one of multiple multi-stage data processing pipelines in an interleaved multi-threaded processor. Also, the multi-stage data processing pipeline may be adapted to receive the instruction from at least one of multiple threads.

FIG. 4 illustrates an exemplary, non-limiting embodiment of a portable communication device that may utilize a device for executing instructions in a multi-stage data processing pipeline and a method of executing instructions in a multi-stage data processing pipeline, such as that described with respect to FIGS. 1-3, and is generally designated 400. The portable communications device 400 includes an on-chip system 422 that includes a processor, such as a digital signal processor 410 having a simple instruction execution unit 412 and power control logic 414 (as described with respect to FIGS. 1-3). FIG. 4 also shows a display controller 426 that may be coupled to the digital signal processor 410 and to a display 428. Moreover, an input device 430 may be coupled to the digital signal processor 410. Additionally, a memory 432 is coupled to the digital signal processor 410. A coder/decoder (CODEC) 434 can also be coupled to the digital signal processor 410. A speaker 436 and a microphone 438 can be coupled to the CODEC 434.

FIG. 4 also indicates that a wireless controller 440 can be coupled to the digital signal processor 410 and to a wireless antenna 442. In a particular embodiment, a power supply 444 is coupled to the on-chip system 422. In a particular embodiment, as illustrated in FIG. 4, the display 428, the input device 430, the speaker 436, the microphone 438, the wireless antenna 442, and the power supply 444 are external to the on-chip system 422. However, each is coupled to a component of the on-chip system 422.

In a particular illustrative embodiment, the simple instruction execution unit 412 may decode an instruction to determine when the instruction can be executed using less than a number of available stages in a multi-stage data processing pipeline. The simple instruction execution unit 412 may then skip at least one stage of the multi-stage data processing pipeline during execution of the decoded instruction. The simple instruction execution unit 412 may also execute at least one non-skipped stage during execution of the decoded instruction. In another particular embodiment, the power control logic 414 may reduce power to the multi-stage data processing pipeline during the at least one skipped stage. Reducing the power may include turning off dynamic power to the at least one skipped stage. Reducing the power may also include turning off static power to the at least one skipped stage. The power control logic 414 may increase the power prior to execution at a stage of the multi-stage data processing pipeline that will not be skipped.

Those of skill would further appreciate that the various illustrative logical blocks, configurations, modules, circuits, and algorithm steps described in connection with the embodiments disclosed herein may be implemented as electronic hardware, computer software, or combinations of both. To clearly illustrate this interchangeability of hardware and software, various illustrative components, blocks, configurations, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present disclosure.

The steps of a method or algorithm described in connection with the embodiments disclosed herein may be embodied directly in hardware, in a software module executed by a processor, or in a combination of the two. A software module may reside in RAM memory, flash memory, ROM memory, PROM memory, EPROM memory, EEPROM memory, registers, hard disk, a removable disk, a CD-ROM, or any other form of storage medium known in the art. An exemplary storage medium is coupled to the processor such that the processor can read information from, and write information to, the storage medium. In the alternative, the storage medium may be integral to the processor. The processor and the storage medium may reside in an ASIC. The ASIC may reside in a computing device or a user terminal. In the alternative, the processor and the storage medium may reside as discrete components in a computing device or user terminal.

The previous description of the disclosed embodiments is provided to enable any person skilled in the art to make or use the disclosed embodiments. Various modifications to these embodiments will be readily apparent to those skilled in the art, and the generic principles defined herein may be applied to other embodiments without departing from the spirit or scope of the disclosure. Thus, the present disclosure is not intended to be limited to the embodiments shown herein but is to be accorded the widest scope possible consistent with the principles and novel features as defined by the following claims.

What is claimed is:

1. A method comprising:
   decoding an instruction to determine whether the instruction can be executed using less than a number of stages in a multi-stage data processing pipeline;
   skipping a particular stage in the multi-stage data processing pipeline in response to determining that due instruction can be executed using less than the number of stages, wherein skipping the particular stage comprises holding the instruction in a register during a particular clock cycle associated with execution of the instruction at the particular stage;
   selecting a source of the instruction for a stage that is subsequent to the particular stage in the multi-stage data processing pipeline, wherein selecting the source includes selecting between the register and an output of the particular stage; and
   executing the instruction at the stage that is subsequent to the particular stage during another clock cycle.

2. The method of claim 1, further comprising reducing power to the multi-stage data processing pipeline during the particular clock cycle.

3. The method of claim 2, wherein reducing power comprises turning off dynamic power to the particular stage.

4. The method of claim 2, wherein reducing power comprises turning off power to the particular stage.

5. The method of claim 2, further comprising increasing power to an unskipped stage of the multi-stage data processing pipeline prior to the instruction being received at the unskipped stage.

6. The method of claim 1, wherein the register is a current instruction register (CIR).

7. The method of claim 1, wherein the decoding is performed prior to execution of the instruction.

8. The method of claim 6, further comprising receiving the instruction at the multi-data data processing pipeline from the CIR.

9. The method of claim 1, wherein the multi-stage date processing pipeline is one of a plurality of multi-stage data processing pipe-lines in an interleaved multi-threading processor.

10. The method of claim 1, wherein the multi-stage data processing pipeline is adapted to receive the instruction from at least one of multiple threads.

11. The method of claim 1, wherein the decoding further comprises identifying the instruction.

12. The method of claim 1, wherein the instruction comprises a write-only instruction.

13. The method of claim 1, wherein the instruction does not include a register the read.

14. The method of claim 1, wherein the instruction comprises a combine instruction.

15. A hardware processor comprising:
   a register adapted to load a first instruction;
   a first instruction execution pipeline comprising a first plurality of stages;
   a control logic circuit coupled to the first instruction execution pipeline, the control logic circuit adapted to:
      skip a particular stage of the first instruction execution pipeline after determining that the first instruction can be executed using fewer than all of the first plurality of stages, wherein skipping the particular stage comprises holding the first instruction in the register during a particular clock cycle associated with execution of the first instruction at the particular stage:
      select a source of the instruction for a stage that is subsequent to the particular stage in the first instruction execution pipeline, wherein selecting the source includes selectin between the register and an output of the particular stage; and
      execute the first instruction at the stage that is subsequent to the particular stage during another clock cycle.

16. The hardware processor of claim 15, wherein the control logic circuit is further adapted to reduce power to the first instruction execution pipeline during the particular clock cycle.

17. The hardware processor of claim 15, wherein the control logic circuit is further adapted to decode the first instruction to determine whether the first instruction can be executed using less than all of the first plurality of stages.

18. The hardware processor of claim 15, wherein the first instruction execution pipeline comprises six stages.

19. The hardware processor of claim 15, wherein the first instruction comprises a write-only instruction.

20. The hardware processor or claim 15, wherein the first instruction comprises a read-only instruction.

21. The hardware processor of claim 15, further comprising a register file coupled to the first instruction execution pipeline and adapted to store an operand based on the first instruction.

22. The hardware processor of claim 15, further comprising:
   a second instruction execution pipeline comprising a second plurality of stages; and
   wherein the control logic circuit is coupled to the second instruction execution pipeline and the control logic circuit is adapted to:
      skip at least one stage of the second instruction execution pipeline during execution of the first instruction in the second instruction execution pipeline; and
      after skipping the at least one stage of the second instruction execution pipeline, execute the second instruction at a second stage that is subsequent to the at least one stage of the second plurality of stages during a third clock cycle.

23. The hardware processor of claim 22, further comprising a register file, wherein the register file is coupled to the first instruction execution pipeline and to the second instruction execution pipeline.

24. A hardware processor comprising:
   an instruction execution pipeline comprising multiple stages;
   a register file adapted to receive data from the instruction execution pipeline;
   means for determining that an instruction can be executed using a number of stages that includes at least one stage and that is less than all of the multiple stages;
   means for skipping a particular stage of the multiple stages of the instruction execution pipeline, wherein the means for skipping the particular stage comprises means for holding the instruction in a register during a particular clock cycle associated with execution of the instruction at the particular stage; and means for selecting a source of the instruction for a stage that is subsequent to the particular stage in the instruction execution pipeline, wherein selecting the source includes selecting between the register and an output of the particular stage.

25. The hardware processor of claim 24, wherein the register comprises an instruction register coupled to the instruction execution pipeline.

26. The hardware processor of claim 24, wherein the register file is a unified register file.

27. The hardware processor of claim 24, further comprising means for reducing power to the particular stage while skipping to particular stage.

28. A wireless hardware computer device comprising:
a receiver adapted to receive data via a wireless communication channel;
a processor responsive to the receiver, wherein the processor includes:
a multi-stage pipeline responsive to a first memory; and
wherein the processor is adapted to:
decode an instruction to determine whether the instruction can be executed using less than a number of stages in the multi-stage pipeline;
skip a particular stage of the multi-stage pipeline in response to a determination that the instruction can be executed using less than the number of stages in the multi-stage pipeline, wherein skipping the particular stage comprises holding the instruction in a register during a particular clock cycle associated with execution of the instruction at the particular stage;
selecting a source of the instruction for a stage that is subsequent to the particular stage in the multi-stage pipeline, wherein selecting the source includes selecting between the register and an output of the particular stage; and
execute the instruction at the stage that is subsequent to the particular stage during another clock cycle.

29. The hardware processor of claim 15, wherein the control logic circuit further comprises a discrete timing circuit adapted to determine a holding cycle corresponding to the particular clock cycle associated with execution or the instruction at the particular stage.

30. The hardware processor of claim 22, wherein the control logic circuit is further adapted to select one of the first instruction execution pipeline and the second instruction execution pipeline, wherein the selection is based on a first count of stages of the first plurality of stages at the first instruction execution pipeline and based on a second count of stages of the second plurality of stages at the second instruction execution pipeline.

31. The hardware processor of claim 15, wherein the control logic circuit further comprises a controller, a first multiplexer, and a second multiplexer, wherein the first multiplexer is operable to provide the first instruction to a first stage of the first plurality of stages, and wherein the second multiplexer is operable to provide the first instruction to a second stage of the first plurality of stages.

32. The method of claim 1, wherein skipping the particular stage comprises not providing the decoded instruction to the particular stage.

33. The method of claim 1, further comprising skipping a second particular stage of the multi-stage data processing pipeline in response to determining that the instruction can be executed using less than the number of stages, wherein skipping the second particular stage comprises holding the instruction in the register during a second particular clock cycle associated with execution of the instruction at the second particular stage, and wherein the stage that is subsequent to the particular stage is also subsequent to the second particular stage in the multi-stage data processing pipeline.

34. The method of claim 1, wherein skipping the first particular stage further comprises forwarding the instruction from the register to the stage that is subsequent to the particular stage after holding the instruction in the register during the particular clock cycle.

35. The hardware processor or claim 15, wherein skipping the particular stage further comprises forwarding the instruction from the register to the stage that is subsequent to the particular stage after holding the instruction in the register during the particular clock cycle.

36. The hardware processor of claim 24, wherein the means for skipping the particular stage further comprises means for forwarding the instruction from the register to the stage that is subsequent to the particular stage after holding the instruction in the register during the particular clock cycle.

37. The wireless hardware computer device of claim 28, wherein skipping the particular stage further comprises forwarding the instruction from the register to the stage that is subsequent to the particular stage after holding the instruction in the register during the particular clock cycle.

38. The method of claim 1, wherein selecting between the register and the output of the particular stage includes:
in response to determining that the instruction is executable using less than the number of stages, selecting the register as the source; and
in response to determining that the instruction cannot be executed using less than the number of stages, selecting the output of the particular stage as the source.

* * * * *